United States Patent
Isono et al.

(10) Patent No.: US 7,333,130 B2
(45) Date of Patent: Feb. 19, 2008

(54) APPARATUS AND METHOD OF RE-ADJUSTING CONVERGENCE OF A PROJECTION TV

(75) Inventors: Katsuo Isono, Tokyo (JP); Kunihiro Yoshizawa, Tokyo (JP)

(73) Assignee: LG Electronics Inc., Seoul (KR)

( * ) Notice: Subject to any disclaimer, the term of this patent is extended or adjusted under 35 U.S.C. 154(b) by 540 days.

(21) Appl. No.: 10/479,122

(22) PCT Filed: May 29, 2002

(86) PCT No.: PCT/KR02/01016

§ 371 (c)(1),
(2), (4) Date: Oct. 5, 2004

(87) PCT Pub. No.: WO02/098142

PCT Pub. Date: Dec. 5, 2002

(65) Prior Publication Data

US 2005/0052580 A1    Mar. 10, 2005

(30) Foreign Application Priority Data

May 30, 2001 (JP) .............................. 2001-163258

(51) Int. Cl.
*H04N 17/00* (2006.01)

(52) U.S. Cl. ...................................... 348/189; 348/746

(58) Field of Classification Search ........ 348/189–191, 348/745–747, 806, 807; 345/14, 15; 353/69, 353/31
See application file for complete search history.

(56) References Cited

U.S. PATENT DOCUMENTS

| | | | | |
|---|---|---|---|---|
| 4,485,394 A | * | 11/1984 | Ghaem-Maghami et al. | 348/189 |
| 4,593,308 A | * | 6/1986 | Kemplin | 348/189 |
| 4,754,204 A | * | 6/1988 | Ando et al. | 315/367 |
| 4,835,602 A | * | 5/1989 | Duwaer | 348/746 |
| 4,857,998 A | * | 8/1989 | Tsujihara et al. | 348/747 |
| 5,282,033 A | * | 1/1994 | Gleim et al. | 348/180 |
| 5,422,693 A | * | 6/1995 | Vogeley et al. | 353/122 |
| 5,883,476 A | | 3/1999 | Noguchi et al. | |
| 5,898,465 A | | 4/1999 | Kawashima et al. | |
| 6,196,687 B1 | * | 3/2001 | Smith | 353/31 |
| 2003/0122972 A1 | * | 7/2003 | Nelson et al. | 348/745 |

* cited by examiner

*Primary Examiner*—Victor R. Kostak
(74) *Attorney, Agent, or Firm*—Birch, Stewart, Kolasch & Birch, LLP

(57) ABSTRACT

A method and an apparatus of re-adjusting convergence of a projection TV are disclosed. The apparatus includes a display device on which an image is projected and at least one light-sensing element (101) being provided around the display device. The light-sensing element (101) is composed of first and second sub-sensors (101a, 101b) that generate separate output signal projected alignment pattern moves over the sub-sensors (101a, 101b). The apparatus further includes a microprocessor calculating a convergence re-adjustment vector by obtaining a location of the light-sensing element (101), from which a previous convergence correction was made. The location of the light-sensing element (101) is obtained by analyzing the output signals. By using the apparatus and method of present invention, the misconvergence of the projection TV can be corrected very quickly and precisely.

25 Claims, 7 Drawing Sheets

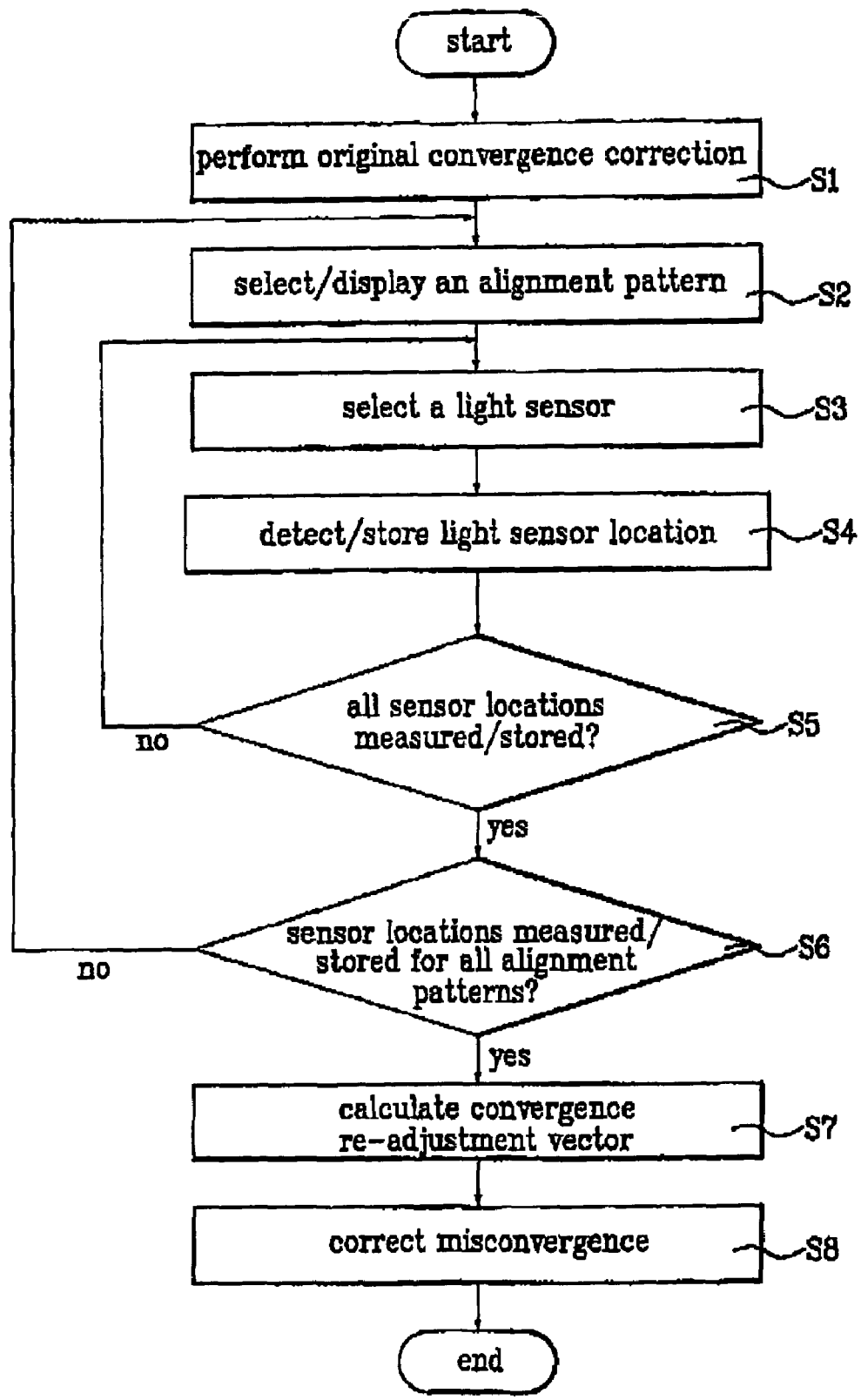

APPARATUS AND METHOD OF RE-ADJUSTING CONVERGENCE OF A PROJECTION TV

This application is the national phase under 35 U.S.C. § 371 of PCT International Application No. PCT/KR02/01016 which has an International filing date of May 29, 2002, which designated the United States of America.

BACKGROUND OF THE INVENTION

1. Field of the Invention

The present invention relates to a projection TV, and more particularly, to an apparatus and a method of re-adjusting convergence of a projection TV.

2. Discussion of the Related Art

In general, there are many ways to correct the convergence of a projection TV having red/green/blue (R/G/B) projection tubes. FIG. 1 illustrates an example of typical convergence correction devices for a projection TV. The device shown in FIG. 1 includes R/G/B projection tubes 18r, 18g, and 18b; a screen 11; location detectors 12 placed on each side of the screen 11; a pattern generator 15 generating an alignment pattern; a signal switch/amplifier 16; and a convergence compensator 14 controlling convergence yokes 17r, 17g, and 17g in accordance with signals outputted from the location detectors 12. Each location detector 12 may include a phototransistor or a charged couple device (CCD) linear sensor for location detection.

A method of adjusting the convergence of a projection TV using the device shown in FIG. 1 will now be described in detail. First, the locations of the location detectors 12 placed on each side of the screen 11 are obtained using the signals outputted from the detectors 12. Next, a convergence error is calculated using the locations of the location detectors 12. Then the convergence is corrected based on the calculated convergence error value. However, the measured locations of the location detectors 12 are not precise enough due to many problems. For that reason, the convergence correction performance based on the above method is often unsatisfactory.

In order to solve at least the problems set above, a greater number of photo transistors or very expensive CCD linear sensors have been used, however, these create further problems of adding complexity to the system and increasing the production cost. Alternatively, amorphous solar cells are often used for precisely measuring the locations of the detectors, but they require supplemental devices such as an A/D converter and involve a complex algorithm for calculating the convergence error value.

SUMMARY OF THE INVENTION

Accordingly, the present invention is directed to an apparatus and a method for re-adjusting convergence of a projection TV that substantially obviates one or more problems due to limitations and disadvantages of the related art.

An object of the present invention is to provide an apparatus and a method of re-adjusting convergence of a projection TV using a convergence re-adjusting system having a simple circuit structure, reducing the production cost.

Another object of the present invention is to provide an apparatus and a method of re-adjusting convergence of a projection TV that is able to provide an improved convergence correction performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus of automatically re-adjusting convergence of a projection TV according to the present invention includes a display device, on which an image is projected; at least one light-sensing element being provided around the display device, the light-sensing element being composed of fist and second sub-sensors that generate separate output signals as a projected alignment pattern moves over the sub-sensors; and a microprocessor calculating a convergence re-adjustment vector by obtaining location of the light-sensing element, from which a previous convergence correction was made, the location of light-sensing element being obtained by analyzing the output signals.

Preferably, the apparatus further includes a convergence controller generating a convergence yoke current in accordance with the re-adjustment vector; and a projection part converging the projected image in accordance with the yoke current.

Preferably, the apparatus further includes a comparative part providing an informative signal to the microprocessor, the informative signal indicating $T_{horizontal}$ and $T_{vertical}$ which represent each time at which the output signals cross each other as the projected alignment moves over the sub-sensors in a horizontal direction and a vertical direction, respectively; and a memory storing the obtained location of the light-sensing element. The microprocessor obtains the location of light-sensing element by taking horizontal and vertical positions of the alignment pattern at time=$T_{horizontal}$ and $T_{vertical}$, respectively. The re-adjustment vector starts from a present convergence location and ends at a previous convergence location, at which a previous convergence vector starting from the location of the light-sensing element also ends. The previous convergence vector is stored in the memory when the previous convergence correction based on the previous convergence vector is previously performed.

In another aspect of the present invention, a method of automatically re-adjusting convergence of a projection TV according to the present invention includes the steps of (a) projecting an alignment pattern and moving the projected pattern over at least one light-sensing element provided around a display device, the light sensor including first and second sub-sensors; and (b) obtaining a location of the light-sensing element by taking horizontal and vertical positions of the alignment pattern at time=$T_{horizontal}$ and $T_{vertical}$, where=$T_{horizontal}$ and $T_{vertical}$ represent each time at which separate output signals generated from the sub-sensors cross each other as the projected pattern moves over the sub-sensors in a horizontal direction and a vertical direction, respectively.

The method further includes the steps of (c) calculating a previously corrected convergence location from the obtained location of the light-sensing element, from which a previous convergence correction was made; (d) obtaining a convergence re-adjustment vector that begins from a present convergence location and ends at the previously corrected convergence location; and (e) performing a convergence re-adjustment on an image projected on the display device in accordance with there-adjustment vector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

Figure 1:
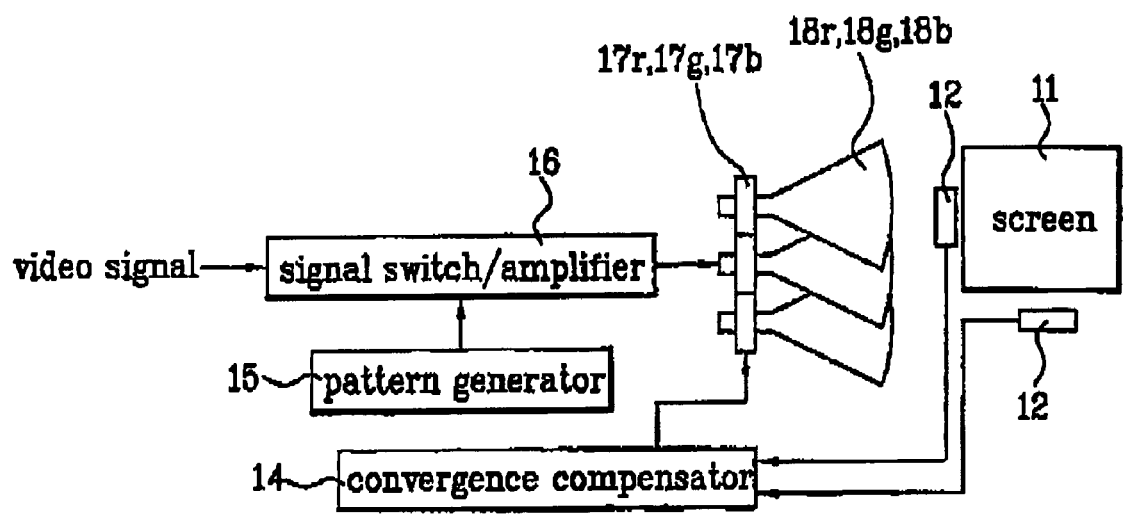
FIG. 1 illustrates an existing convergence correction system for a projection TV.
Figure 2:
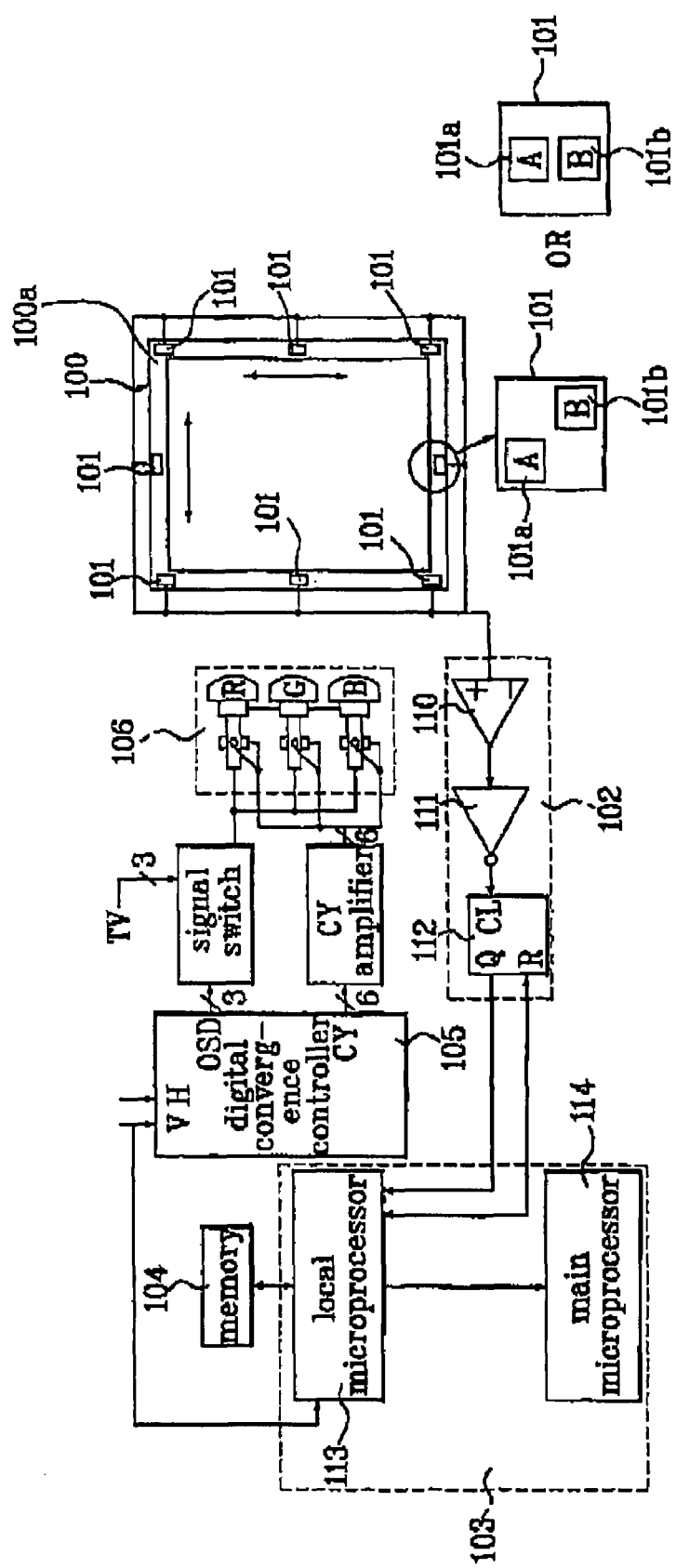
Figure 3:
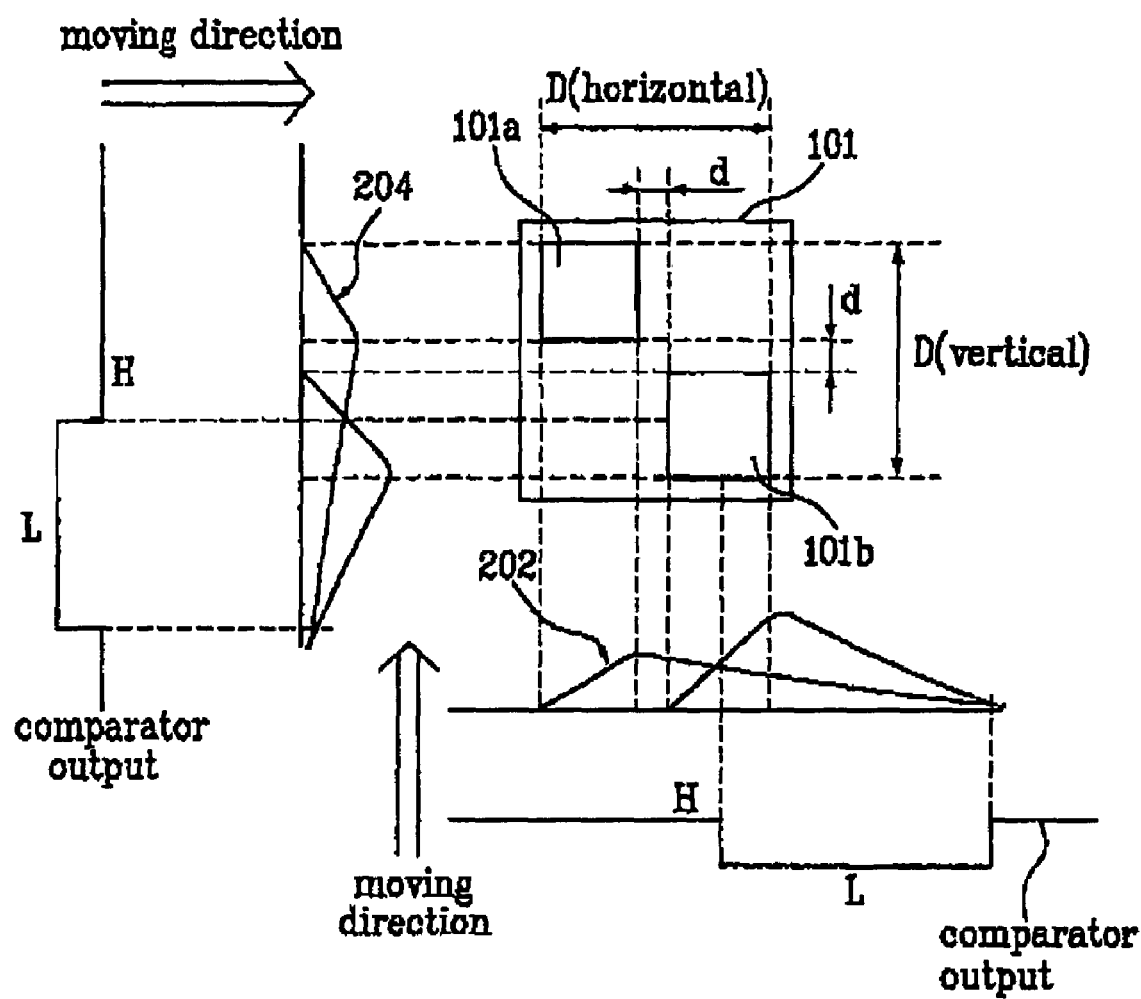
Figure 4:
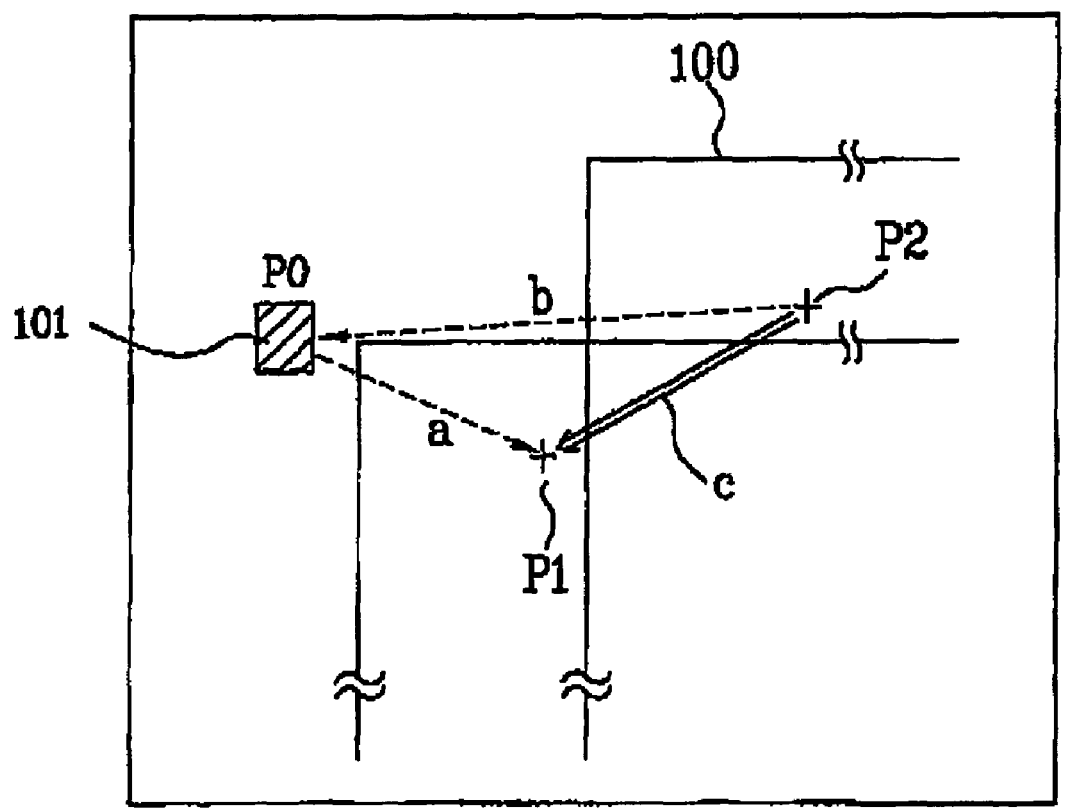
Figure 5A:
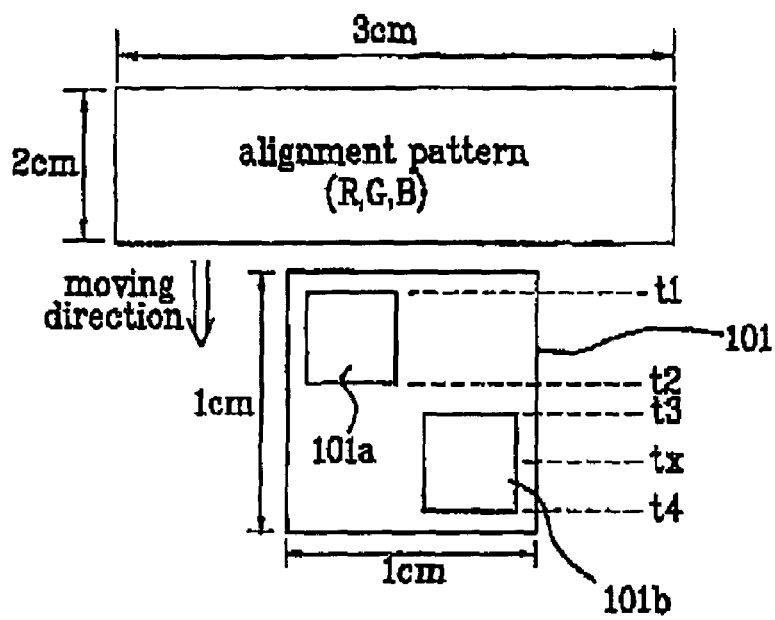
Figure 5B:
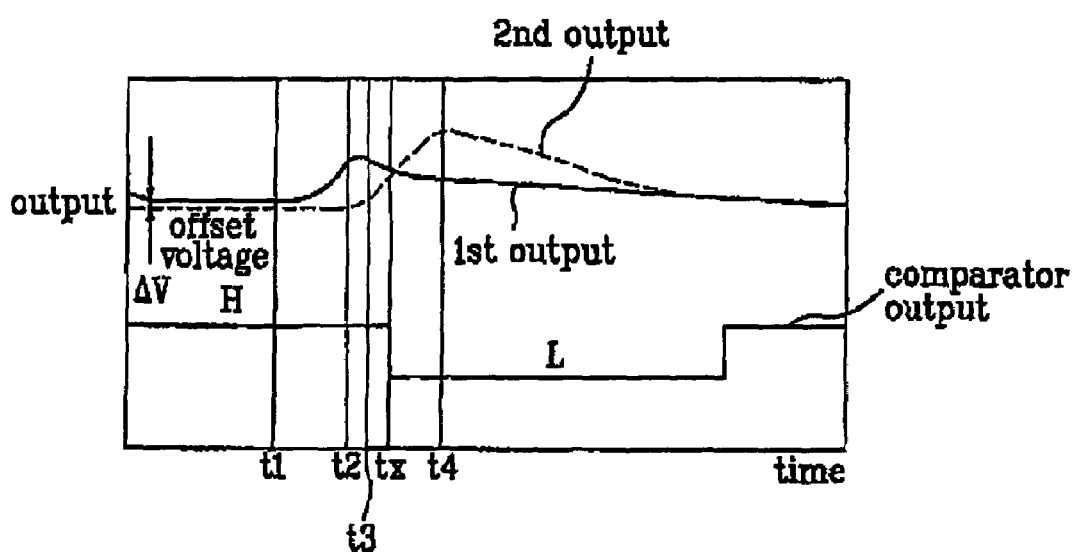
Figure 6:
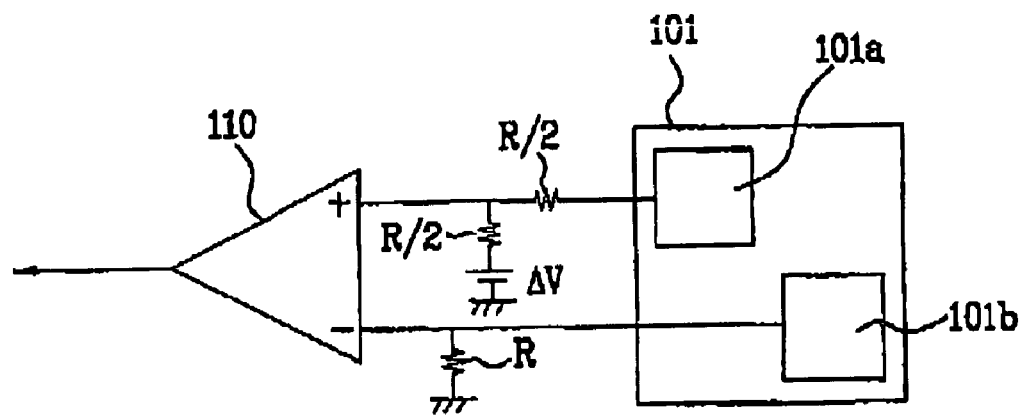
Figure 7:
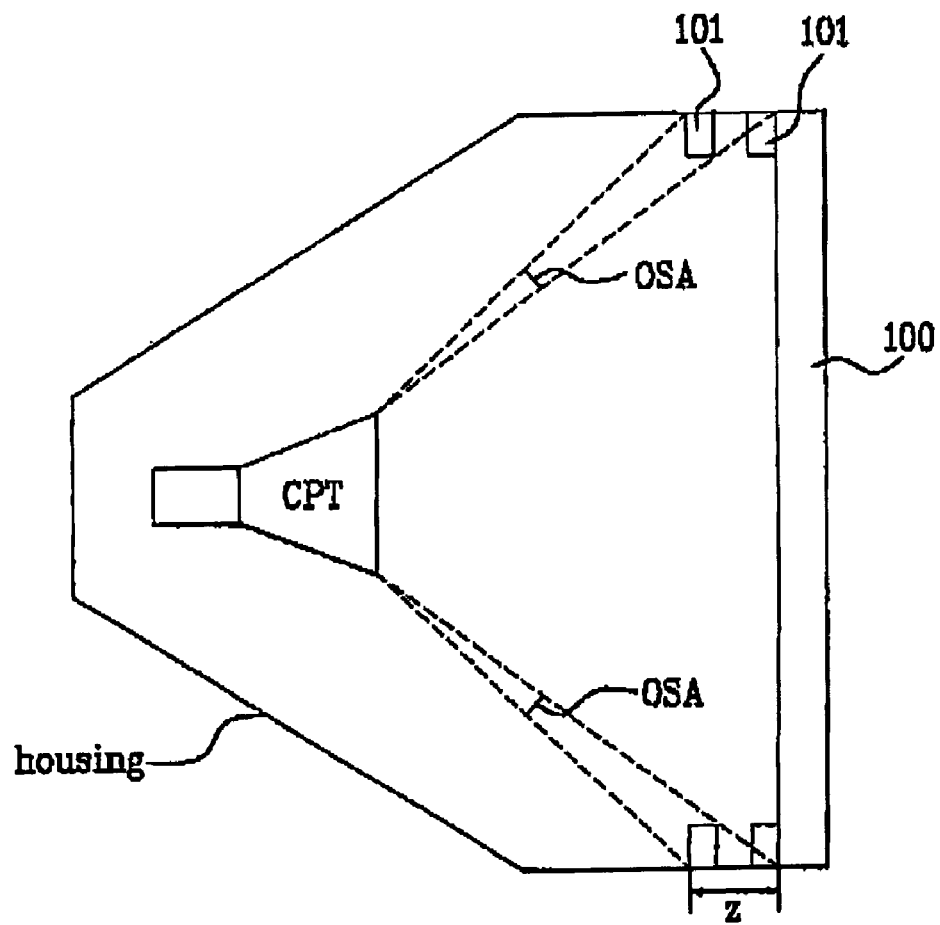

FIG, 2 illustrates an apparatus of automatically re-adjusting convergence of a projection TV according to the present invention;

FIG. 3 illustrates a light sensor shown in FIG. 2 in detail and its corresponding output signals as a projected alignment pattern moves;

FIG. 4 illustrate how a convergence re-adjustment vector is obtained for a projection TV in accordance with the present invention;

FIG. 5A illustrates how an alignment pattern moves over a light sensor in accordance with the present invention;

FIG. 5B illustrates how separate output signals are generated from sub-sensors of a light-sensing element when an alignment pattern moves over the light-sensing element;

FIG. 6 illustrates a connection been a light-sensing element and a comparator in accordance with the present invention;

FIG. 7 illustrates installation positions of light sensors in a projection TV; and FIG. 8 is a flow chart illustrating a method of re-adjusting convergence of a projection TV in accordance with the present invention.

DETAILED DESCRIPTION OF THE INVENTION

Reference will now be made in detail to the preferred embodiments of the present invention, examples of which are illustrated in the accompanying drawings. Wherever possible, the same reference number will be used through the drawings to refer to the same or like parts.

One of the main principles of the present invention is to precisely and rapidly re-adjusting convergence of a projection TV by (1) initially calculating the locations of light-sensing elements by observing separate output signals generated from two sub-sensors included in each light-sensing element and (2) calculating the misconvergence error using the light-sensing element locations.

FIG. 2 illustrates an automatic convergence re-adjusting apparatus for a projection TV according to the present invention. As it can be seen from the figure, the apparatus includes a display device 100, a plurality of light-sensing elements 101, a comparative part 102, a system controller 103, a memory 104, a digital convergence controller 105, and a projection part 106. Each light-sensing element 101 includes a first sub-sensor 101*a* and a second sub-sensor 101*b*. The comparative part 102 includes a comparator 110, an inverter 111, and a latch circuit 112. The system controller 103 includes a local microprocessor 113 and a main microprocessor 114.

There are a total of eight light-sensing elements 101 provided around the display device 100: one on each corner and one on each side of the display device 100. Alternatively, only four light-sensing elements 101 may be provided: one on each side of the display device 100.

The number of the light-sensing elements 101 and their locations depend on the type of the convergence correction. For example, it is preferable to use eight light-sensing elements 101 for dynamic convergence corrections as shown in FIG. 2 or to use four light-sensing elements 101 on each side of the display device 100 for static convergence corrections.

For static convergence corrections, it is preferable that the first and second sub-sensors 101*a* and 101*b* of each light-sensing element 101 are arranged side by side (up/down or left/right) with a predetermined vertical or horizontal distance between them. On the other hand, it is preferable that the sub-sensors 101*a* and 101*b* of each light-sensing element 101 are located diagonally, as shown in FIG. 2, for dynamic convergence corrections. Alternatively, the convergence re-adjusting apparatus of the present invention may include both types of light-sensing elements: elements including side-by-side arranged sub-sensors and diagonally arranged sub-sensors.

FIG. 3 illustrates one of the light-sensing elements 101 shown in FIG. 2 in detail. The light-sensing element 101 shown in FIG. 3 includes a first sub-sensor or 101*a* and a second sub-sensor 101*b*. The sub-sensors are preferably amorphous solar cell type sensors, but other type of sensors may also be used for the sub-sensors in the present invention.

Referring to FIG. 3, the first and second sub-sensors 101*a* and 101*b* are diagonally located at a predetermined horizontal and vertical distance d from each other. The size of the light-sensing element 101, which is denoted as D, can be obtained by adding the sizes of both sub-sensors and the distance d. For example, for a projection HDTV having a diagonal size of 60 inches and 1920 by 1080 pixels, the horizontal and vertical sizes of each pixel of the TV screen are approximately 0.69 mm. In this case, the distance d between the sub-sensors 101*a* and 101*b* is preferably about 0.69 mm, and it is preferable that the size D is sufficiently larger than 0.69 mm (e.g., D>6.9 mm).

The main reason of having two sub-sensors in each light-sensing element 100 is to precisely measure the misconvergence of the projection TV using an alignment pattern. In general, the convergence of a projection TV is initially corrected in a factory. However, a misconvergence due to its environmental changes and surrounding devices occurs when a user uses the TV at home. Therefore, in order to correct the misconvergence, it is important to find a location from which the previous convergence correction was made. These will be explained in more detail with references to FIG. 4.

FIG. 4 illustrates how to correct the misconvergence of a projection TV in accordance with the present invention. In FIG. 4, P1 represents the location of the previous convergence corrected at a factory, and P2 is the location of the present convergence moved from P1 due to environmental changes. P0 represents the location of a light-sensing element. Therefore, an additional convergence re-adjustment is necessary to move the location of the convergence from P2 to P1.

First of all, in order to find a vector c shown in FIG. 4, which represents the direction and distance of the desired convergence re-adjustment, vectors a and b must be given. Vector a represents distance and direction associated with the original convergence correction performed at a factory, and it starts from the location of the light-sensing element P0 and ends at P1. The vector a is predetermined at a factory and stored in a memory included in the projection TV, then the vector c can be easily found by obtaining the vector b using an alignment pattern in accordance with present invention. The vector b can be obtained easily by finding the location of the light-sensor P0 since P2 is known.

As mentioned above, the convergence correction apparatus of the present invention initially finds the location of the light-sensing element 101 P0 by moving a projected alignment pattern over the light-sensing element in horizontal and vertical directions. Next, the location of the present convergence P1 is found since vector a (original convergence correction) is given. Finally, the vector c can be easily found using the locations of P1 and P2.

A method of obtaining the location of a light-sensing element in accordance with the present invention will now be made with references to FIGS. 3, 5A, and 5B. In general, an alignment pattern for detecting the location of a light-sensing element 101 includes red, green, and blue alignment patterns, and its rectangular are is reasonably larger than the area of the light-sensing element 101. For the present invention, a 1 cm by 1 cm light-sensing element 101 and a 2 cm by 3 cm alignment pattern are used as shown in FIG. 5A.

First of all, as shown in FIG. 2, the local microprocessor 113 of the system controller 103 receives a command for a convergence re-adjustment and sends the command to the digital convergence controller 105. Then the digital convergence controller 105 projects an alignment pattern on the display device 100 through the RGB projection part 106 and moves the projected alignment pattern over a light-sensing element 101 for detecting its location.

As shown in FIG. 5A, the alignment pattern passes through a first sub-sensor 101a and a second sub-sensor 101b of the light-sensing element 101. FIG. 5B illustrates how first and second output signals, which are generated from the first and second sub-sensors 101a and 101b respectively, vary in time as the alignment pattern passes over both sub-sensors as shown in FIG. 5A. Referring to FIG. 5B, the first output signal varies in an interval between t1 and t2, in which the pattern passes over the first sub-sensor 101a. Similarly, the second output signal varies in an interval between t3 and t4, in which the pattern passes over the second sub-sensor 101b. Since the gain of the first sub-sensor 101a is preset to be a half of the gain of the second sub-sensor 101b, the peak of the first output signal is about 50% of the peak of the second output signal. The main reason of presetting gains of the first and second sub-sensors 101a and 101b in that manner is to easily detect the location of the pattern at time=Tx (the first and second output signals cross each other at time=Tx). At time=Tx, the pattern passes over the center of the second sub-sensor 101b. The vertical location of the pattern at time=Tx will be used as the vertical location of the light-sensing element 101 for correcting the misconvergence shown in FIG. 4.

If the area of the first sub-sensor 101a is about 50% of the area of the second sub-sensor 101b, presetting gains of the sub-sensors as described above may not be necessary.

FIG. 6 illustrates a connection between a light-sensing element 101 and the comparator 110. Referring to FIG. 6, in order to detect the location of the pattern at time=Tx, the first and second sub-sensors 101a and 101b are connected to the positive and negative terminals of the comparator 110 respectively, and they send their output signals to the comparator 110. The resistor having a resistance of R (100 Ω<R<1KΩ) shown in FIG. 6 is an I(current)–V(voltage) conversion resistor of an amorphous solar cell. The present invention uses the resistor with R for I-V conversion, but an OP amplifier may be used instead.

A first resistor having a resistance of R/2 is connected between the positive terminal of the comparator 110 and first sub-sensor 101a for setting the gain of the first sub-sensor 101a to a half of the gain of the second sub-sensor 101b. In addition, by providing a proper offset voltage ΔV between a ground and a second resistor having a resistance of R/2, whose the other end is connected to the positive terminal, the signal outputted from the comparator 110 can be always High even if both sub-sensors do not receive any light and can be combined with another output signal in form of wired OR. Therefore, the present invention uses an OP amp having an open collector for the comparator 110, and a pull-up resistor is connected to an output of the OP amp (not illustrated).

FIG. 3 also illustrates the outputs of the comparator 110 shown in FIG. 2 as an alignment pattern moves over one of the light-sensing elements 101 in a horizontal or vertical direction. When the alignment pattern arrives at about the center of the second sub-sensor 101b, the output signals of both sub-sensors cross each other, and the output signal of the comparator 110 becomes low (L) from high (H).

Therefore, the horizontal and vertical locations of the light-sensing element 101 can be obtained by observing the outputs of the comparator 110. When the comparator 110 outputs an informative signal indicating the location of the light-sensing element 101, the inverter 111 reverses the informative signal of the comparator 110. Then the latch circuit 112 latches the reversed signal.

The convergence re-adjusting apparatus according to the present invention may include only one comparative part 102 connected to all the light-sensing elements 101 as shown FIG. 2 for simplifying structure, or it may include eight separate comparative parts, each of which is connected to each light-sensing element 101, for significantly reducing the processing time.

FIG. 7 illustrates the installation positions of the light-sensing elements 101 in the projection TV. As it is shown, the light-sensing elements 101 are provided on the over-scan-area of the display device 100. If, by any chance, there is not enough space available at the back of the display device 100, they can be provided at a distance (z) from the backside of the display device 100. However, the light intensity at the distance z should be reasonably high for detecting light.

FIG. 8 is a flow chart illustrating a method of re-adjusting the convergence of a projection TV in accordance with the present invention. First of all, the manufacturer of the projection TV performs an original convergence correction in a factory and stores an original convergence correction vector (direction and distance) associated with the original convergence correction in a memory included (S1). After any misconvergence due to any environmental changes or surrounding devices occurs, the digital convergence controller 105 selects one of R/G/B alignment patterns and projects the selected alignment pattern on a display device 100 through the projection part 106 (S2).

Next, the system controller 103 selects one of a plurality of light-sensing elements 101 provided around the display device 100 of the TV (S3). Then, it measures and stores the location of the selected light-sensing element (S4) by moving the projected alignment pattern over the selected light-sensing element in horizontal and vertical directions. The horizontal location $L_x$ of the selected element is the horizontal location of the alignment pattern at time=$T_x$, where $T_x$ is the time at which the output signals generated from the two sub-sensors of the selected light-sensing element cross each other when the alignment pattern moves in the horizontal direction. Similarly, the vertical location $L_y$ of the sensor is the horizontal location of the alignment pattern at time=$T_y$, where $T_y$ is the time at which the output signals generated from the sub-sensors of the selected light-sensing element cross each other when the alignment pattern moves in the vertical direction. Then, the controller 105 stores the measured location of the light-sensing element ($L_x$ and $L_y$) in the memory.

Next, the system controller 103 check whether the locations of all the light-sensing elements 101 corresponding to the selected alignment pattern are stored in the memory (S5). If it is determined in the step S5 that they are not, the controller 105 repeats the steps S3 and S4 until the locations of all the sensors 101 are measured and stored in the memory.

If the controller 105 determines that the locations of all the sensors 101 corresponding to the selected alignment pattern are measured and stored in the memory in the step S5, it further checks whether the locations of the light-sensing elements 101 corresponding to all of the R/G/B alignment patterns are measured and stored. If they are not, the controller 105 repeats the steps S2 to S5 until they are measured and stored.

On the other hand, if it is determined that the locations of all the sensors 101 corresponding to all the alignment patterns are measured and stored in the step S6, the local microprocessor 113 calculates a re-adjustment vector (vector c), which represents the distance and distance of a desired convergence re-adjustment (S7). It initially obtains the location of the original convergence (P1 shown in FIG. 4) for each light-sensing element 101 using the location of the light-sensing element (P0) stored in the memory, and it calculates the re-adjustment vector by P1 and P2, where P2 represents a known location of the present convergence.

Finally, the digital convergence controller 105 corrects the misconvergence of the projection TV in accordance with the re-adjustment vector found in the step S7 (S8).

In the apparatus and method of re-adjusting convergence of a projection TV, the location of each light-sensing element is measured using the output signals generated from the sub-sensors and alignment patterns. Therefor, the location of each light-sensing element can be precisely measure, and the sensitivity of each light-sensing element is greatly improved. In addition, the location of each light-sensing element is measured by directly observing the output signals of the sub-sensors, there is no need to use an expensive A/D converter. This means that the misconvergence of the TV can be corrected by a simple circuit structure according to the present invention.

Another advantage of the invention is that the location of each light-sensing element can be found by simply moving alignment patterns only in horizontal and vertical directions.

Another advantage of the present invention is a high-speed process of measuring the locations of the light-sensing elements because the measurements are performed directly through a comparator.

It will be apparent to those skilled in the art that various modifications and variations can be made in the present invention without departing from the spirit or scope of the inventions. Thus, it is intended that the invention covers the modifications and variations of this invention provided they come within the scope of the appended claims and their equivalents.

The invention claimed is:

1. An apparatus of automatically re-adjusting convergence of a projection TV, the apparatus comprising:
   a display device, on which an image is projected;
   at least one light-sensing element being provided around said display device said light-sensing element being composed of first and second sub-sensors that generate separate output signals as a projected alignment pattern moves over said sub-sensors;
   a microprocessor calculating a convergence re-adjustment vector by obtaining a location of said light-sensing element, from which a previous convergence correction was made, said location of light-sensing element being obtained by analyzing said output signals;
   a comparative part providing an informative signal to said microprocessor, said informative signal indicating $T_{horizontal}$ and $T_{vertical}$ which represent each time at which said output signals cross each other as said projected alignment moves over said sub-sensors in a horizontal direction and a vertical direction, respectively; and
   a memory storing said obtained location of said light-sensing element.

2. The apparatus of claim 1, further comprising:
   a convergence controller generating a convergence yoke current in accordance with said re-adjustment vector; and
   a projection part converging said projected made in accordance with said yoke current.

3. The apparatus of claim 2, wherein said convergence controller provides a control signal to said projection pattern for moving said projected pattern over said sub-sensors.

4. The apparatus of claim 1, wherein said comparative part includes a comparator receiving said output signals generated from said sub-sensors and generating said informative signal, an inverter inverting said information signal, and a latch circuit latching said inverted signal.

5. The apparatus of claim 1, wherein said microprocessor obtains said location of light-sensing element by taking horizontal and vertical positions of said alignment pattern at time=$T_{horizontal}$ and $T_{vertical}$, respectively.

6. The apparatus of claim 5, wherein said re-adjustment vector starts from a present convergence location and ends at a previous convergence location, at which a previous convergence vector starting from said location of said light-sensing element also ends.

7. The apparatus of claim 6, wherein said previous convergence vector is stored in said memory when said previous convergence correction based on said previous convergence vector is previously performed.

8. The apparatus of claim 1, wherein said first and second sub-sensors are diagonally arranged within said light-sensing element or are arranged side by side within said light-sensing element.

9. The apparatus of claim 1, wherein a light-receiving area of said first sub-sensor is about 50% of a light-receiving area of said second sub-sensor.

10. The apparatus of claim 1, wherein a gain of said first sub-sensor is about 50% of a gain of said second sub-sensor.

11. An apparatus for automatically re-adjusting convergence of a projection TV, the apparatus comprising:

a display device, on which an image is projected;

at least one light sensor being provided around said display device, said light sensor being composed of first and second sub-sensors generating separate output signals as a projected alignment pattern moves over said sub-sensors;

a comparative part generating an informative signal that indicates $T_{horizontal}$ and $T_{vertical}$, where $T_{horizontal}$ and $T_{vertical}$ represent each time at which said separate output signals cross each other as a said alignment pattern moves over said sub-sensors in a horizontal direction and a vertical direction, respectively;

a system controller calculating a convergence re-adjustment vector by obtaining a location of said light sensor from which a previous convergence correction was made, said location of light senor being obtained by taking horizontal and vertical positions of said alignment pattern at time=$T_{horizontal}$ and $T_{vertical}$, respectively;

a convergence controller generating a control signal for moving said alignment pattern and generating a convergence yoke current in accordance with said re-adjustment vector;

a projection part converging said projected image in accordance with said current; and a memory storing said obtained location of said light sensor.

12. The apparatus of claim 11, wherein said light sensor is provided on a backside of said display device or at a predetermined distance behind said backside.

13. The apparatus of claim 11 wherein said light sensor is provided at each corner of said display device and an each of top, bottom, left, and right sides of said display device.

14. The apparatus of claim 11, wherein said light sensor is provided on each of top, bottom, left, and right sides of said display device.

15. The apparatus of claim 11, wherein said first and second sub-sensors are diagonally arranged within said light sensor or are arranged side by side within said light sensor.

16. The apparatus of claim 11, wherein a light-receiving area of said first sub-sensor is about 50% of a light-receiving area of said second sub-sensor.

17. The apparatus of claim 11, wherein a gain of said first sub-sensor is about 50% of a gain of said second sub-sensor.

18. The apparatus of claim 11, wherein said comparative part includes a comparator receiving said output signals generated from said sub-sensors and generating said informative signal, an inverter inverting said informative signal, and a latch circuit latching said inverted signal.

19. A method of automatically correcting misconvergence of a projection TV, the method comprising the steps of:

projecting an alignment pattern and moving said projected pattern over at least one light-sensing element provided around a display device, said light sensor including first and second sub-sensors;

obtaining a location of said light-sensing element by taking horizontal and vertical positions of said alignment pattern at time=$T_{horizontal}$, and $T_{vertical}$, where=$T_{horizontal}$ and $T_{vertical}$ represent each time at which separate output signals generated from said sub-sensors cross each other as said projected pattern moves over said sub-sensors in a horizontal direction and a vertical direction, respectively;

calculating a previously corrected convergence location from said obtained location of said light-sensing element, from which a previous convergence correction was made; obtaining a convergence re-adjustment vector that begins from a present convergence location and ends at said previously corrected convergence location; and performing a convergence re-adjustment on an image projected on said display device in accordance with said re-adjustment vector.

20. The method of claim 19, further comprising the step of storing said obtained location of said light-sensing element in a memory.

21. The method of claim 19, wherein said first and second sub-sensor are diagonally arranged within said light-sensing element.

22. The method of claim 19, wherein said first and second sub-sensors are arranged side-by-side within said light-sensing element.

23. The method of claim 19, wherein direction and distance associated with said previous convergence correction are previously stored in a memory.

24. The method of claim 19, wherein a light-receiving are of said first sub-sensor is about 50% of a light-receiving area of said second sub-sensor.

25. The method of claim 19, wherein a gain of said first sub-sensor is about 50% of a gain of said second-sensor.

* * * * *